United States Patent Office 2,977,365
Patented Mar. 28, 1961

2,977,365
3-DEHYDROYOHIMBANES AND THEIR PREPARATION

Frank L. Weisenborn, Oskar P. Wintersteiner, and Patrick A. Diassi, all of New Brunswick, N.J., assignors to Olin Mathieson Chemical Corporation, New York, N.Y., a corporation of Virginia
No Drawing. Filed Apr. 16, 1956, Ser. No. 578,200
9 Claims. (Cl. 260—286)

This invention relates to the synthesis of alkaloids and more particularly to the preparation of esters of reserpic acid.

Prior to this invention, there was no known method for converting the stable pharmacologically inactive 3-iso form of reserpic acid esters to their less stable pharmacologically-active epimers, all previous attempts having resulted either in the destruction of the molecule or the recovery of only the inactive 3-iso starting material. We have found, however, that by the practice of the process of this invention, it is now possible to convert the inactive 3-iso form to the active form through the 3-dehydro intermediate.

The process of this invention essentially comprises interacting the stable 3-iso form of an ester of reserpic acid with a mercuric salt in an organic solvent, treating the 3-dehydro derivative thus formed with an electropositive metal in an acid medium, and recovering the resultant ester of reserpic acid.

This series of reactions can be represented by the following equation:

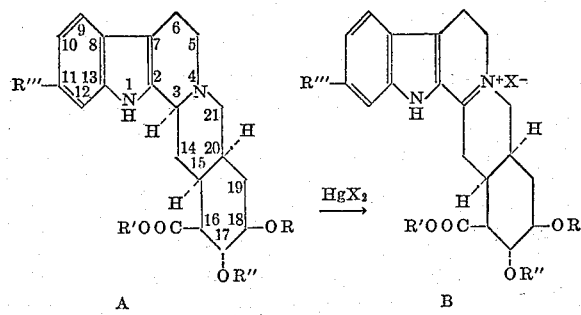

| | |
|---|---|
| I   R=3,4,5-trimethoxybenzoyl; R'=R''=CH₃; R'''=CH₃O. | V    R=3,4,5-trimethoxybenzoyl; R'=R''=CH₃; R'''=CH₃O; X=NO₃. |
| II  R=CH₃CO—; R'=R''=CH₃; R'''=CH₃O. | VI   R=CH₃CO—; R'=R''=CH₃; R'''=CH₃O; X=ClO₄. |
| III R=H; R'=R''=CH₃; R'''=CH₃O. | VII  R=H; R'=R''=CH₃; R'''=CH₃O; X=ClO₄. |
| IV  R=2,3,4-trimethoxybenzoyl; R'=R''=CH₃; R'''=H. | VIII R=2,3,4-trimethoxybenzoyl; R'=R''=CH₃; R'''=H; X=NO₃. |

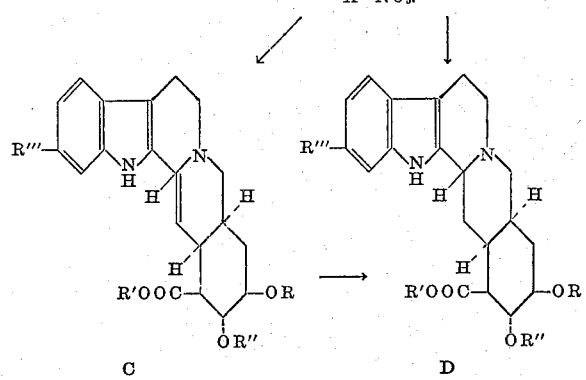

| | |
|---|---|
| IX   R=3,4,5-trimethoxybenzoyl; R'=R''=CH₃; R'''=CH₃O. | XIII  R=3,4,5-trimethoxybenzoyl; R'=R''=CH₃; R'''=CH₃O. |
| X    R=CH₃CO—; R'=R''=CH₃; R'''=CH₃O. | XIV   R=CH₃CO—; R'=R''=CH₃; R'''=CH₃O. |
| XI   R=H; R'=R''=CH₃; R'''=CH₃O. | XV    R=H; R'=R''=CH₃; R'''=CH₃O. |
| XII  R=2,3,4-trimethoxybenzoyl; R'=R''=CH₃; R'''=H. | XVI   R=2,3,4-trimethoxybenzoyl; R'=R''=CH₃; R'''=H. | wherein R is any esterifying group and includes the acyl radicals of such acids as carboxylic acids (preferably having less than ten carbon atoms) as exemplified by the lower alkanoic acids (e.g. acetic, propionic, and enanthic acid), monocyclic aromatic carboxylic acids (e.g. benzoic, trimethoxybenzoic, 3,4-dichlorbenzoic, and anisic acid), monocyclic aromatic aliphatic carboxylic acids (e.g. phenyl-acetic, and cinnamic acid), monocyclic heterocyclic acids (e.g. furoic and nicotinic acid), and sulfonic acids as exemplified by lower alkane sulfonic acids (e.g. methane sulfonic acid) and aromatic sulfonic acids (e.g. p-toluene sulfonic acid), R' is lower alkyl (preferably methyl), R'' is hydrogen or methyl, and R''' is hydrogen or methoxy. The preferred radicals defined by R are the acyl radicals of lower alkanoic acids, benzoic acid, and lower alkoxy substituted benzoic acids.

To prepare the 3-dehydro intermediates of this invention, a 3-iso reserpate (Compound A) is interacted with a salt of divalent mercury ($HgX_2$, wherein $X_2$ is two equivalents of anion X, X being any anion, and preferably being the anion of a lower alkanoic acid, as exemplified by acetic acid, i.e. mercuric acetate). This reaction is preferably carried out at elevated temperature (optimally at a temperature in the range of about 50° C. to about 100° C.) in an organic solvent for both the reserpate and mercuric salt reactants. The choice of a particular solvent will depend, of course, on the solubility characteristics of the chosen reserpate and mercuric salt. When mercuric acetate is used, the preferred solvent is acetic acid. If the reaction is carried out at an elevated temperature in the optimal range set forth above, the reaction is completed in less than three hours to yield the desired 3-dehydro compound (Compound B) in near quantitative yield.

If it is desired to recover the 3-dehydro compound from the reaction mixture, the reaction mixture is treated with an acid or a salt which is soluble in the reaction medium but which yields an insoluble salt with the 3-dehydro base whereby a precipitate of the 3-dehydro base in its salt form (Compound B) is obtained, which can be then separated from the reaction mixture by filtration or centrifugation. The preferred acids or soluble salts used in this step of the process are those containing inorganic anions, as exemplified by the mineral acids.

If desired, the salt of the 3-dehydro compound can be converted to its free base form (Compound C) by addition of an inorganic base, such as 5% sodium carbonate solution, and extracting the organic base thus liberated into chloroform. The free organic base is then recovered from the chloroform by evaporation of the solvent.

To convert the 3-dehydro compound in either its salt or free base form (Compounds B and C) to the desired final product (Compound D), the 3-dehydro compound is interacted with an electropositive metal (e.g. zinc or tin) in an acid medium (preferably an aqueous acid wherein the 3-dehydro compound is soluble, as exemplified by aqueous acetic acid). If this reduction step is attempted with the normally used hydrogenating agents, such as hydrogen in the presence of a hydrogenation catalyst (e.g. platinum, Raney nickel, or sodium boron hydride), the 3-dehydro is reconverted to the starting iso material.

The reduction of the 3-dehydro compound can be carried out with either the purified, isolated salt or base (Compounds B or C), or in situ, employing the reaction medium obtained from the oxidation of Compound A to Compound B (or C). Furthermore, the final step in the process of this invention can be used to reduce the 3-dehydro compound regardless of whether it in turn is made from the iso compound or prepared by total synthesis.

By the practice of this invention, there is therefore achieved a method for converting the 3-iso form of reserpic acid esters, which are stable but pharmacologically inactive, to their epimers, which are unstable but pharmacologically active, and further this invention also provides a process whereby the inactive 3-dehydro intermediates, whether prepared from the 3-iso epimers or synthetically, can be selectively reduced to yield the therapeutically active normal reserpic acid esters to the exclusion of their inactive iso epimers. Specific examples of such conversions, more fully detailed in the following examples, include the conversion of 3-iso-reserpine (3-epireserpine) to reserpine via the new intermediate 3-dehydroreserpine, the conversion of methyl 3-isoreserpate 18-acetate to methyl reserpate 18-acetate, the conversion of methyl 3-isoreserpate to methyl reserpate through the new intermediate methyl 3-dehydroreserpate, and the conversion of 11-desmethoxy-3-isoreserpine to 11-desmethoxyreserpine.

The following examples illustrate the invention (all temperatures being in centigrade), the first six examples illustrating methods for preparing the 3-dehydro compounds (Compounds B and C) of this invention:

EXAMPLE 1

*3-dehydroreserpine nitrate (V)*

1.00 g. of 3-iso-reserpine (I) is dissolved in 15 ml. of acetic acid and a warm solution of 3.0 g. of mercuric acetate in 15 ml. of acetic acid is added. The mixture is warmed at 60° under nitrogen for two and one-half hours during which time the mercurous acetate slowly precipitates. The mercurous acetate is filtered, washed with acetic acid and dried (yield 100%). The filtrate is warmed and the excess mercuric ion is precipitated with hydrogen sulfide. The mercuric sulfide is centrifuged off, washed with acetic acid and the combined acetic acid extracts are evaporated to dryness in vacuo. The residue is dissolved in 40% aqueous acetic acid and a saturated solution of ammonium nitrate is added. The precipitate of 3-dehydroreserpine nitrate is filtered off and recrystallized from methanol-water to give yellow needles, M.P. 160–170°, about 1.00 g. (91%).

EXAMPLE 2

*Methyl 3-dehydroreserpate 18-acetate perchlorate (VI)*

Methyl 3-isoreserpate 18-acetate (II) (268 mg.) in 5 ml. of acetic acid is added to a warm solution of 850 mg. of mercuric acetate in 5 ml. of warm acetic acid and the solution heated at 60° for two hours under nitrogen. The precipitate of mercurous acetate (93% yield) is filtered off and the excess mercuric ion removed by precipitation with hydrogen sulfide. The acetic acid solution is diluted with an equal volume of water and the product isolated as the perchlorate salt by the addition of perchloric acid, about 277 mg. (85%), melts at 168–171°, resolidifies, M.P. 234–237°.

EXAMPLE 3

*Methyl 3-dehydroreserpate perchlorate (VII)*

1.02 g. of methyl 3-iso-reserpate (III) dissolved in 11 ml. of acetic acid is added to a warm solution of 4.0 g. of mercuric acetate in 11 ml. of acetic acid and the mixture is heated at 60° for two hours under nitrogen. The precipitate of mercurous acetate (100% yield) is filtered off and the excess mercuric ion precipitated with hydrogen sulfide. The precipitate of mercuric sulfide is centrifuged off and washed with acetic acid. The addition of an equimolar amount of perchloric acid to the acetic acid solution gives a yellow amorphous precipitate of methyl 3-dehydroreserpate perchlorate (67% yield).

EXAMPLE 4

*11-desmethoxy-3-dehydroreserpine nitrate (VIII)*

By substituting 1.0 g. of 11-desmethoxy-3-iso-reserpine (IV) for the 3-iso-reserpine in the procedure of Example 1, 11-desmethoxy-3-dehydro-reserpine nitrate is obtained.

EXAMPLE 5

*3-dehydroreserpine (IX)*

3-dehydroreserpine perchlorate (251 mg.) is treated with 20 ml. of 5% sodium bicarbonate and the mixture extracted with chloroform. The chloroform extracts are washed with water, dried over sodium sulfate and concentrated in vacuo. The residue of orange, amorphous free base, is about 208 mg.

EXAMPLE 6

*Methyl 3-dehydroreserpate 18-acetate (X)*

Methyl 3-dehydroreserpate 18-acetate perchlorate (175 mg.) is dissolved in 15 ml. warm methanol water (1:1) and 5 drops concentrated ammonium hydroxide are added. On cooling the free base crystallizes. It is filtered, washed with water and recrystallized from chloroform-methanol. (about 100 mg.). M.P. 248–250.5° C.

In a similar manner, methyl 3-dehydroreserpate perchlorate and 11-desmethoxy-3-dehydroreserpine nitrate can be converted to methyl 3-dehydroreserpate (XI) and 11-desmethoxy-3-dehydroreserpine (XII), respectively, by the procedure of either Example 5 or Example 6.

The following three examples illustrate methods by which the 3-dehydro intermediates are reduced to the final compounds of this invention:

EXAMPLE 7

*Reserpine (XIII)*

A solution of 943 mg. of 3-dehydroreserpine nitrate (V) in 50 ml. of 50% aqueous acetic acid is treated with 10 g. of zinc dust and the mixture stirred at room temperature under nitrogen for twenty-four hours. The excess zinc is filtered off, washed with water, and the near colorless filtrate is concentrated in vacuo to 10 ml., diluted with 50 ml. of water, made alkaline with ammonium hydroxide and extracted with chloroform. The chloroform extracts are washed with water, dried over sodium sulfate and concentrated to dryness in vacuo. Fractional crystallization of the residue from methanol gives reserpine, about 396 mg. (42%), M.P. 255–257°.

EXAMPLE 8

*Methyl reserpate-18-acetate (XIV)*

175 mg. of methyl 3-dehydroreserpate 18-acetate perchlorate (VI) is dissolved in 10 ml. of 50% aqueous acetic acid and treated with 1.0 g. of zinc dust for twenty-four hours at room temperature. The excess zinc is filtered off, washed with water and the colorless filtrate made alkaline with ammonium hydroxide and extracted with chloroform. The chloroform extracts are washed with water, dried over sodium sulfate and concentrated to dryness in vacuo. The residue is fractionally crystallized from chloroform-methanol to give methyl reserpate acetate, M.P. 286–288°, yield about 25 mg. (17%).

EXAMPLE 9

*Methyl reserpate (XV)*

940 mg. of methyl 3-dehydroreserpate perchlorate (VII) is dissolved in 100 ml. of 50% aqueous acetic acid, 10 g. of zinc dust is added and the mixture allowed to stand at room temperature overnight. The zinc dust is filtered off and the filtrate taken to dryness in vacuo. The residue is dissolved in 100 ml. of water, made alkaline with ammonium hydroxide and extracted with chloroform. The combined chloroform extracts are washed with water, dried over sodium sulfate and evaporated to dryness. The residue (about 757 mg.) is chromatographed on 20 g. of neutral alumina. The fractions eluted with chloroform (about 130 mg., 17% yield) are combined and recrystallized from benzene to give methyl reserpate, M.P. 236–238°, $[\alpha]_D$–101° (chloroform), yield about 80 mg.

EXAMPLE 10

11-desmethoxyreserpine (XVI)

In a similar manner, by substituting 11-desmethoxy-3-dehydroreserpine nitrate (VIII) for the 3-dehydroreserpine nitrate in the procedure of Example 7, 11-desmethoxyreserpine is obtained.

Furthermore, in each of the Examples 7 through 10, the corresponding free bases (Compounds IX through XII) can be substituted for the respective salts (Compounds V through VIII), to yield the same final products.

The method described below may be used if it is not desired to isolate the intermediate dehydroreserpine.

EXAMPLE 11

Conversion of 3-isoreserpine (I) to reserpine (XIII)

3-isoreserpine (1.17 g.) is dissolved in 15 ml. of glacial acetic acid and a warm solution of mercuric acetate (3.0 g.) in 15 ml. of glacial acetic acid is added. The mixture is warmed at 60° for two hours under nitrogen during which time flakes of mercurous acetate are deposited. After filtration of the mercurous acetate (95% yield) the excess mercuric ion is removed from the filtrate by precipitation with hydrogen sulfide and the acetic acid solution is concentrated to about 25 ml. in vacuo. The solution is diluted with 25 ml. of water, 10 g. of zinc are added and the mixture stirred at room temperature under nitrogen for 42 hours. The zinc is filtered off and the filtrate evaporated nearly to dryness. The residue is then dissolved in 50 ml. of water, made alkaline with ammonium hydroxide and extracted with chloroform. The combined chloroform extracts are washed with water, dried over sodium sulfate and evaporated to dryness. Fractional crystallization of the residue from methanol-chloroform gives reserpine (about 23% yield), M.P. 265–267°.

The invention may be variously otherwise embodied within the scope of the appended claims.

We claim:

1. A process for preparing a pharmacologically active ester of reserpic acid, which comprises interacting the 3-iso form of the ester with mercuric acetate in a solvent for both the ester and mercuric acetate, treating the 3-dehydro derivative thus formed with an electropositive metal in an acid medium, and recovering the resultant pharmacologically active ester having the hydrogen in the 3-position in the B-configuration.

2. A process for preparing an ester of reserpic acid, which comprises interacting an ester of 3-dehydroreserpic acid with a metal selected from the group consisting of zinc and tin in an acid medium, and recovering the resultant ester of reserpic acid.

3. The process of claim 1 wherein the 3-iso form is 3-isoreserpine.

4. The process of claim 1 wherein the 3-iso form is methyl 3-isoreserpate-18-acetate.

5. The process of claim 1 wherein the 3-iso form is methyl 3-isoreserpate.

6. A process for preparing a 3-dehydroreserpate, which comprises interacting a 3-isoreserpic acid ester at a temperature in the range of about 50° C. to about 100° C. with mercuric acetate in a solvent for both the ester and mercuric acetate and recovering the resultant 3-dehydro derivative.

7. A process for preparing an ester of reserpic acid, which comprises interacting an ester of 3-dehydroreserpic acid with an electropositive metal in an acid medium, and recovering the resultant ester of reserpic acid.

8. A compound selected from the group consisting of 3-dehydroreserpine and salts thereof.

9. A compound selected from the group consisting of methyl 3-dehydroreserpate and salts thereof.

References Cited in the file of this patent

UNITED STATES PATENTS

| | | |
|---|---|---|
| 2,786,843 | Huebner | Mar. 26, 1957 |
| 2,877,225 | Taylor | Mar. 10, 1959 |

OTHER REFERENCES

Journ. Amer. Chem. Soc., MacPhillamy et al., vol. 77, pp. 4335–4343.

Whitmore: Organ. Chem., 2nd ed., Nostrand, N.Y. (1951), p. 309.